3,405,143
NITROGEN FLUORINE COMPOUNDS AND METHOD OF SYNTHESIS

Marion Douglas Meyers and Simon Frank, Stamford, Conn., assignors to American Cyanamid Company, Stamford, Conn., a corporation of Maine
No Drawing. Filed June 16, 1966, Ser. No. 559,051
5 Claims. (Cl. 260—349)

ABSTRACT OF THE DISCLOSURE

This invention relates to a novel process which comprises reacting anhydrous hydrazoic acid with a compound having the formula

wherein R and R' are, individually, $N_3$, $NF_2$, F or

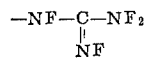

radicals, in the presence of a catalytic amount of a nitrogen containing material, and the compounds produced thereby. Still more particularly, this invention relates to a process which comprises reacting the product produced by reacting hydrazoic acid with a compound represented by Formula I, with fluorine gas, and the products produced thereby.

---

The process of the present invention proceeds according to the equation

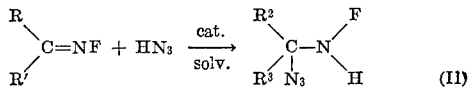

wherein R and R' are as defined above and $R^2$ and $R^3$ are, individually, $N_3$, $NF_2$ or

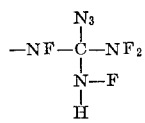

radicals.

As mentioned above, the reaction is carried out in the presence of a nitrogen containing catalyst. Examples of such materials include trialkyl amines such as trimethyl amine, triethyl amine, tributyl amine, etc., cyclic compounds such as pyridine, quinoline, isoquinoline, α - picoline, pyrazine, pyrimidine, acridine, 1,4 - diazabicyclo [2,2,2]octane and the like. The catalyst concentration in the solvent ranges from about 0.001 mole percent to about 5 mole percent, preferably from about 0.01 mole percent to about 1 mole percent.

Temperatures ranging from about —140 to about 50° C., preferably from about —111 to 25° C., may be used.

Solvents such as fluorochlorocarbon materials, i.e., $CFCl_3$, fluorocarbon oils, $CHFCl_2$,

and the like must also be employed during the reaction.

The starting materials, i.e., those of Formula I are produced by direct fluorination of the corresponding hydrogen derivative by methods well known to those skilled in the art.

Examples of the novel compounds of Formula II, produced herein and useful as intermediates for the production of further novel compounds according to a second aspect of the instant invention, include:

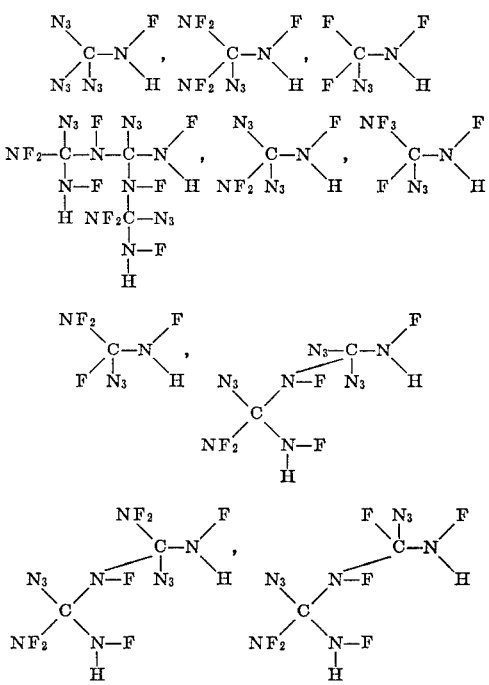

and the like.

As mentioned above, these compounds are useful as intermediates for the production of compounds containing higher concentrations of nitrogen and fluorine. This second novel class of compounds is produced according to the equation:

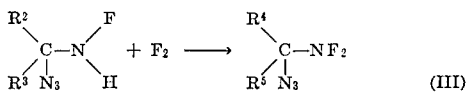

wherein $R^2$ and $R^3$ are as defined above and $R^4$ and $R^5$ are, individually, $N_3$, $NF_2$, F or

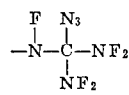

radicals.

This reaction is conducted at about —40° C. to about 100° C., preferably about —25 to about 50° C., i.e., in the vapor phase, with a molar excess of fluorine gas to starting material, i.e., that of Formula II.

The compounds represented by Formula III find use as oxidizers in rocket propellant compositions and also as intermediates for the production of additional compounds through reaction with the azide group thereof. Examples of compounds represented by Formula III include

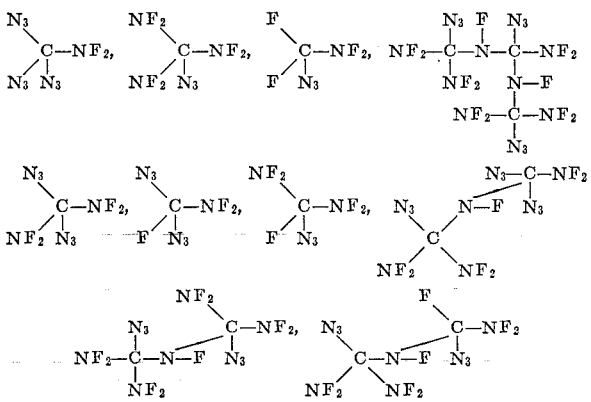

and the like.

The following examples are set forth for purposes of illustration only and are not to be construed as limiting the instant invention except as set forth in the appended claims. All parts and percentages are by weight unless otherwise specified.

EXAMPLE 1

(Preparation of hydrazoic acid)

Into a suitable apparatus comprising a finger attached to a vacuum line of glass tubing and having an outer joint as a side arm near the top of the finger, is added, slowly from an L-shaped tube attached to the side of the arm, 1.8 parts of concentrated sulfuric acid onto 0.5 part of sodium azide in the bottom of the finger. The resultant gas is passed through a U-trap at −79° C. and hydrazoic acid is retained in the trap as a clear liquid.

EXAMPLE 2

Into a suitable reaction vessel containing a magnetic stirring bar are charged 10,000 parts of $$CCl_2F\text{—}CFCl\text{—}CFCl\text{—}CCl_2F$$

The vessel is attached to a vacuum line, evacuated and cooled to −111° C. 0.048 part of pyridine, 149 parts of perfluoroguanidine [$(NF_2)_2C\text{=}NF$] and 43 parts of hydrazoic acid are charged to the vessel which is then allowed to warm to room temperature. Stirring is started when the temperature reaches −40° C. After ½ hour the resultant reaction mixture is vacuum stripped at 25° C. 172.8 parts of bis(difluoroamino)fluoroaminomethyl azide are recovered in a U-trap at −111° C. The azide is a colorless liquid and very sensitive to shock. It has the following properties.

Vapor pressure: ~30 mm. at 24° C.
Boiling point: ~90° C.
$F^{19}$ NMR:
  $NF_2$ at −24.9$\phi$, broad.
  NHF at 128.7$\phi$, doublet split by ~56 cps.
H'NMR: Two broad peaks centered at +1.42$\tau$, split by 55 cps.
Infrared: Shows bands which are assigned to —$N_3$, —NHF and —$NF_2$ groups.

Following the procedure of Example 2, various other materials are reacted with hydrazoic acid according to the instant invention. The results are set forth in Table I, below.

TABLE I

| Ex. | Formula I compound | Solvent | Catalyst | Temp., °C. | Product produced |
|---|---|---|---|---|---|
| 3 | $NF_2\text{\\}C\text{=}N\text{—}F$ / $F$ | $CFCl_3$* | Triethyl amine | 50 | $NF_2\text{\\}C\text{—}N\text{\\}$ / $F$ \| $N_3$ \| $F$ |
| 4 | $NF_2\text{\\}C\text{=}N\text{—}F$ / $N_3$ | $CHFCl_2$* | α-Picoline | 25 | $NF_2$ \| $(N_3)_2\text{—}C\text{—}N\text{—}H$ \| $F$ |
| 5 | $NF_2$ $NF_2\text{\\}C\text{=}N\text{—}F$ / $C\text{=}N\text{—}F$ / $NF$ | Same as Ex. 2 | Pyridine | −10 | $N_3$ $F$ $N_3$ $F_2N\text{—}C\text{—}N\text{—}C\text{—}NF_2$ / $N$ $N$ / $F$ $H$ $F$ $H$ |
| 6 | $F\text{\\}C\text{=}N\text{—}F$ / $F$ | $CFCl_3$ | Quinoline | −111 | $F$ $H$ $\text{\\}C\text{—}N\text{\\}$ / $F$ \| $F$ \| $N_3$ |

*Removed from product by vacuum stripping at −20° C.

EXAMPLE 7

Into a suitable apparatus composed of three U-tubes connected in series by ball joints are condensed at −111° C., into the first tube, 100 parts of bis(difluoroamino) fluoraminomethyl azide. Liquid nitrogen baths are placed around the second and third tubes. The first tube is allowed to warm to −80° C. and gas streams of helium and fluorine, at a space velocity of 50 cc./min. and 16 cc./min., respectively, are passed through the series of tubes. After 20 minutes, no liquid azide remains in the first tube. The last two tubes are isolated, evacuated and warmed to −111° C. The volatiles are removed and the remaining material is passed through a trap at −30° C. and collected at −196° C. 94.5 parts of tris(difluoroamino)methyl azide are recovered. $F^{19}$ NMR shows a single broad band at −28.7$\phi$. The estimated boiling point is 60° C. The infrared spectrum shows bands which are assigned to —$N_3$ and —$NF_2$ groups.

Following the procedure of Example 7, various other materials are fluorinated according to the instant invention. The results are set forth in Table II, below.

TABLE II

| Ex. | Formula II compound | Temp., °C. | Product produced |
|---|---|---|---|
| 8 | 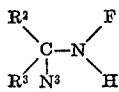 | 100 | 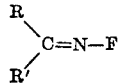 |
| 9 | (N₃)₂—C(NF₂)—N(F)—H | 0 | (N₃)₂—C—(NF₂)₂ |
| 10 | 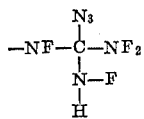 | 50 | 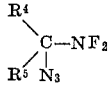 |
| 11 | 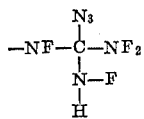 (F,H variant) | −40 |  |

We claim:

1. A compound having the formula $$\begin{array}{c} R^2 \\ \diagdown \\ R^3 \diagup \end{array} C \diagup \begin{array}{c} F \\ \diagdown N \\ \diagup \\ H \end{array}$$
$\quad\quad\quad N_3$ wherein $R^2$ and $R^3$ are, individually, selected from the group consisting of $N_3$, $NF_2$, F and $$-NF-\underset{\underset{H}{\overset{N_3}{|}}}{\overset{|}{C}}-NF_2$$
$\quad\quad N-F$ radicals.

2. A compound according to claim 1 wherein $R^2$ and $R^3$ are $NF_2$ radicals.

3. A method for the production of the compound of claim 1 which comprises reacting hydrazoic acid with a compound having the formula $$\begin{array}{c} R \\ \diagdown \\ R' \diagup \end{array} C = N - F$$

wherein R and R' are, individually, selected from the group consisting of $N_3$, $NF_2$, F and $$-NF-\underset{\underset{F}{\overset{N}{|}}}{\overset{\|}{C}}-NF_2$$

radicals at a temperature ranging from about −140° C. to about 50° C. and in the presence of a tertiary amine catalyst.

4. A compound having the formula $$\begin{array}{c} R^4 \\ \diagdown \\ R^5 \diagup \end{array} C \begin{array}{c} -NF_2 \\ \\ N_3 \end{array}$$

wherein $R^4$, $R^5$ are, individually, selected from the group consisting of $N_3$, $NF_2$, F and $$-NF-\underset{\underset{NF_2}{|}}{\overset{\overset{N_3}{|}}{C}}-NF_2$$

radicals.

5. A compound according to claim 4, wherein $R^4$ and $R^5$ are $NF_2$ radicals.

References Cited

UNITED STATES PATENTS 3,226,439  12/1965  Middleton _____ 260—349 XR
3,228,936   1/1966  Davis et al. _____ 260—564 XR
3,278,595  10/1966  Sheehan et al. ___ 149—109 XR

OTHER REFERENCES

Mitsch: J. Am. Chem. Soc., vol. 87, 1965, pp. 328–333.

HENRY R. JILES, *Primary Examiner*.

C. M. SHURKO, *Assistant Examiner*.